United States Patent [19]

Kim

[11] Patent Number: 5,672,953
[45] Date of Patent: Sep. 30, 1997

[54] CHARGING DEVICE AND CONTROL METHOD FOR PREVENTING RECHARGING OF A FULLY CHARGED BATTERY

[75] Inventor: Hee-Deog Kim, Seoul, Rep. of Korea

[73] Assignee: SamSung Electronics Co., Ltd., Suwon, Rep. of Korea

[21] Appl. No.: 577,093

[22] Filed: Dec. 22, 1995

[30] Foreign Application Priority Data

Dec. 22, 1994 [KR] Rep. of Korea ............... 35964/1994

[51] Int. Cl.$^6$ ..................... H01M 10/44; H01M 10/46
[52] U.S. Cl. ............................................... 320/32; 320/39
[58] Field of Search ................................. 320/20, 21, 22, 320/31, 32, 39

[56] References Cited

U.S. PATENT DOCUMENTS

| | | | |
|---|---|---|---|
| 5,185,565 | 2/1993 | Uchida | 320/39 |
| 5,302,887 | 4/1994 | Ishiguro et al. | 320/32 |
| 5,304,916 | 4/1994 | Le et al. | 320/23 |
| 5,349,282 | 9/1994 | McClure | 320/32 |
| 5,408,170 | 4/1995 | Umetsu et al. | 320/39 |
| 5,420,493 | 5/1995 | Hargadon et al. | 320/32 X |
| 5,465,039 | 11/1995 | Narita et al. | 320/32 |

Primary Examiner—Robert Nappi
Assistant Examiner—Patrick B. Law
Attorney, Agent, or Firm—Robert E. Bushnell, Esq.

[57] ABSTRACT

A charging device and control method for preventing recharging of a fully charged battery. The charging device for a rechargeable battery includes a power unit for outputting a constant voltage of a given level, irrespective of the current output therefrom a battery pack into which the battery is inserted, and a switch for supplying the battery with the constant voltage output from the power unit through the battery pack in response to a switch control signal, and a control unit. The control unit includes a battery voltage sensing unit for sensing a battery voltage every given period of time, a comparing unit for comparing a preset full charge threshold voltage with an output of the battery voltage sensing unit and outputting a signal, and an input/output unit responsive to the signal output by the comparing unit, for driving the switch and turning on the charging of the battery in the event that the sensed battery voltage is less than the full charge threshold voltage, or for driving the switch and turning off the charging of the battery in the event that the sensed battery voltage is more than the full charge threshold voltage.

14 Claims, 5 Drawing Sheets

CHARGING DEVICE AND CONTROL METHOD FOR PREVENTING RECHARGING OF A FULLY CHARGED BATTERY

CROSS REFERENCE TO RELATED APPLICATION

This application refers to, incorporates herein and claims all benefits accruing under 35 U.S.C. §119 from an application Entitled Charging Device for Preventing Recharging of a Fully Charged Battery and Control Method Therefore, that was earlier filed in the Korean Industrial Property Office on the 22nd day of Dec. 1994 and there assigned Serial No 34964/1994.

BACKGROUND OF THE INVENTION

1. Field of the Invention

The present invention relates to a device for charging a rechargeable battery to a given voltage level, and more particularly, to a charging device and control process for preventing recharging of a fully charged battery.

2. Background Art

A battery capable of being recharged after a charged voltage is to some extent discharged through use, is commonly called a rechargeable battery. Presently, rechargeable batteries are widely used in portable and miniaturized systems. Especially in a wireless communication system, a rechargeable battery provided should always be charged sufficiently to provide the user with enough communication time. Conventionally a portable communication device, such as a cellular phone, is charged by using a base unit plugged into wall outlet, or by using a vehicle mounted adapter operated whenever the vehicle is running. A charger usually operates in either a standard mode, having a charging rate of about one quarter of a coulomb (amps/second), or a rapid charging mode having a charging rate of about one coulomb. A battery supplied with a current of about one coulomb in a rapid charging system generally reaches a fully charged state after about an hour.

When the user inserts a battery into a conventional rapid charging system, the insertion of the battery is recognized and charging automatically begins. When the user inserts a fully charged battery into the rapid charging system, the battery voltage can actually decrease (referred to herein as generating a minus delta voltage $-\Delta V$), or overcharging of the battery can occur while executing an unnecessary rapid charging until a given temperature rise occurs. Furthermore, when a vehicle mounted adapter is used, a fully charged battery may be charged too frequently, e.g. each time the vehicle is started.

In other words, when a fully charged battery is again inserted into a charger, heat can be generated in the battery during a rapid charging operation and a memory effect can increase due to frequent charging, thereby reducing the lifetime of the battery. Since a nickel-cadmium (NI-CAD) battery always generates a minus delta voltage $-\Delta V$ when a rapid charging operation is performed on a fully charged battery, a circuit may be provided to sense the $-\Delta V$ and instantly interrupt the charging voltage to prevent the battery from being overcharged. I have learned that a nickel-hydrogen (NI-H) battery does not generate a minus delta voltage $-\Delta V$ at any temperature, until the battery undergoes an arbitrary temperature change At capable of operating a cut-off circuit, so that prior to the operation of the cut-off circuit, overcharging can occur. Hence, when a battery is again inserted into a conventional rapid charging system after either a short or long period without being partially discharged through use, the rapid charging operation can generate the aforementioned overcharging phenomenon, causing overheating and further increasing the memory effect.

A Charging Apparatus disclosed in U.S. Pat. No. 5,302,887 to Ishiguro et al. attempts to prevent overcharging of NiMH batteries, for which the aforementioned delta temperature and minus delta voltage detection techniques have proven inadequate. When a microprocessor recognizes the insertion of a battery by sensing a voltage from an A/D converter, a transistor is immediately turned on to supply a charging current to the battery and determine a positive voltage change per unit time (i.e., an initial charging rate). The apparatus predicts when a fully charged state is reached by detecting a reduced positive delta voltage to prevent overcharging of NiMH batteries, but fails to address the problem of preventing recharging from beginning on an already fully charged inserted battery.

SUMMARY OF THE INVENTION

It is therefore an object of the present invention to provide an improved battery charging device and process.

It is another object to provide a charging device and control process for checking a charged voltage level of a battery, comparing the checked charge level with a preset voltage value indicative of a full charge, and controlling the battery charging voltage on the basis of the comparison.

It is another object to provide a charging device and control method for automatically recognizing a charging level of a battery that has been inserted into a charger.

It is still another object to provide a charging device and control process for eliminating overcharging and overheating phenomena of a battery and for reducing a memory effect due to frequent charging.

It is yet another object to provide a charging device and control process for checking a charging level of a battery, controlling a charging voltage supply in accordance with the checked charging level, eliminating overcharging and overheating phenomena of the battery and reducing memory effects due to frequent charging.

These and other objects can be achieved with a charging device for a battery constructed according to the principles of the present invention, with a power unit for providing a constant voltage of a given level; a battery pack into which a battery is inserted; a switch for supplying the battery with a constant voltage from the power unit through the battery pack in response to a switching control signal, and a bakery voltage sensing unit providing a sensed value of a battery voltage during each period. A first unit compares the output sensed value of the voltage with a preset full charge threshold voltage value and sets a temporary full charge flag when the sensed value is more than the preset full charge threshold voltage. A second unit compares a sensed value provided by the battery voltage sensing unit with the preset full charge threshold voltage value during a constant time period in response to the setting of the temporary full charge flag by the first unit, and sets a completely full charge battery recognition flag when the sensed value is more than the preset full charge threshold voltage. A control unit cuts off the constant voltage supplied by the power unit when the completely full charge battery recognition flag is set by the second unit. The battery voltage sensing unit, the first and second units and the control unit of the charging device are preferably constructed within a single chip microprocessor.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
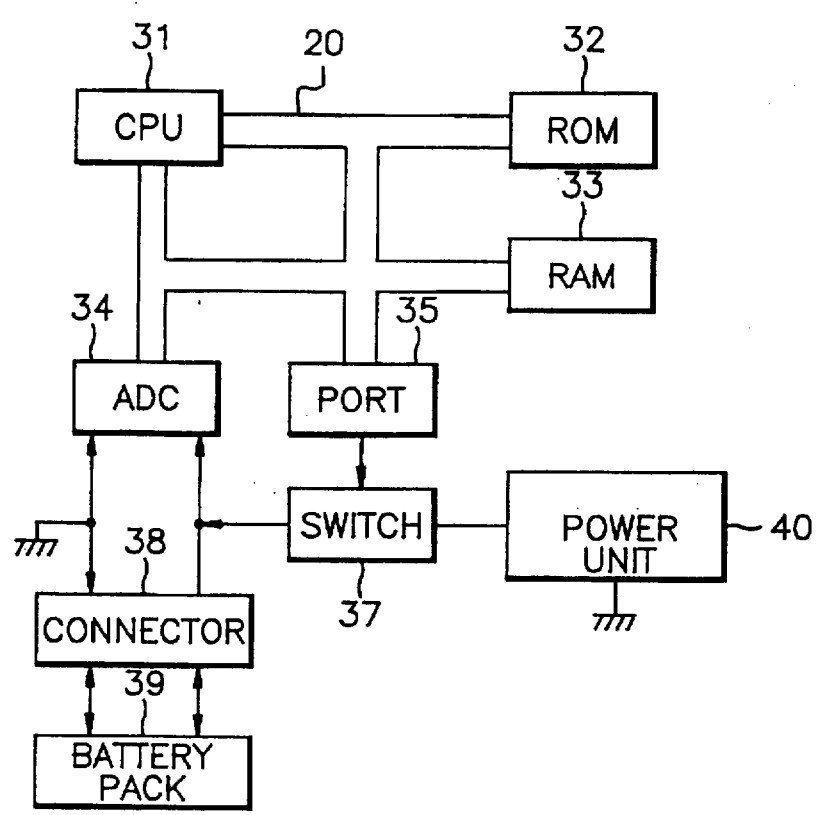
FIG. 1 is a block diagram illustrating a charging device according to the present invention.

Turning now to the drawings, and referring first to FIG. 1, a block diagram illustrates a charging device constructed according to the principles of the present invention for recharging a battery pack 39 formed by one or more rechargeable batteries, electrically coupled across an electrical connector 38. A central processing unit (CPU) 31 controls overall operation of the charging device. A masked read only memory (ROM) 32 stores a control program. A random access memory (RAM) 33 stores execution data read and written under control of the CPU 31. A bus 20 couples ROM 32, RAM 33, central processing unit 31 to input/output port 35 and an analog to digital converter (ADC) 34 for converting an input analog voltage signal into a digital sensed voltage output signal. Connector 38 couples the ADC with the battery pack 39. Power unit 40 provides a constant voltage at a preset given level. Switch 37 interconnects power unit 40 and connector 38, and supplies the constant voltage to the battery pack 39 in response to a control signal generated at the input/output port 35. The charging device illustrated in FIG. except for connector 38, switch 37, battery pack 39 and power unit 40, may be economically constructed using a single-chip monolithic integrated microprocessor capable of performing an analog to digital conversion function.

Control processes stored in ROM 32 are executed by CPU 31 according to the principles of the present invention for preventing overcharging of a battery. CPU 31 reads the output of ADC 34 during each period, e.g., 100 milliseconds for example, to determine when a battery pack 39 has been inserted into the connector 38 and reads an ADC sensing voltage of the battery. The CPU 31 checks whether or not the sensed battery voltage indicates a fully charged state, and either turns off the switch 37 through port 35 to interrupt flow of electrical current through switch 37 in order to stop charging of the battery, or alternatively turns on the switch 37 and starts the charging of the battery in a rapid charging mode when the checked battery voltage is determined not to indicate a fully charged state. If a minus delta voltage $-\Delta V$ occurs, or if a charging time elapses, CPU 31 though port 35 turns off switch 37 to stop the charging of battery pack 39. The control processes are performed under the control of CPU 31 and will be better understood by reference to the following discussion of FIGS. 2A, 2B, 3, 4A and 4B.

Figure 2A:
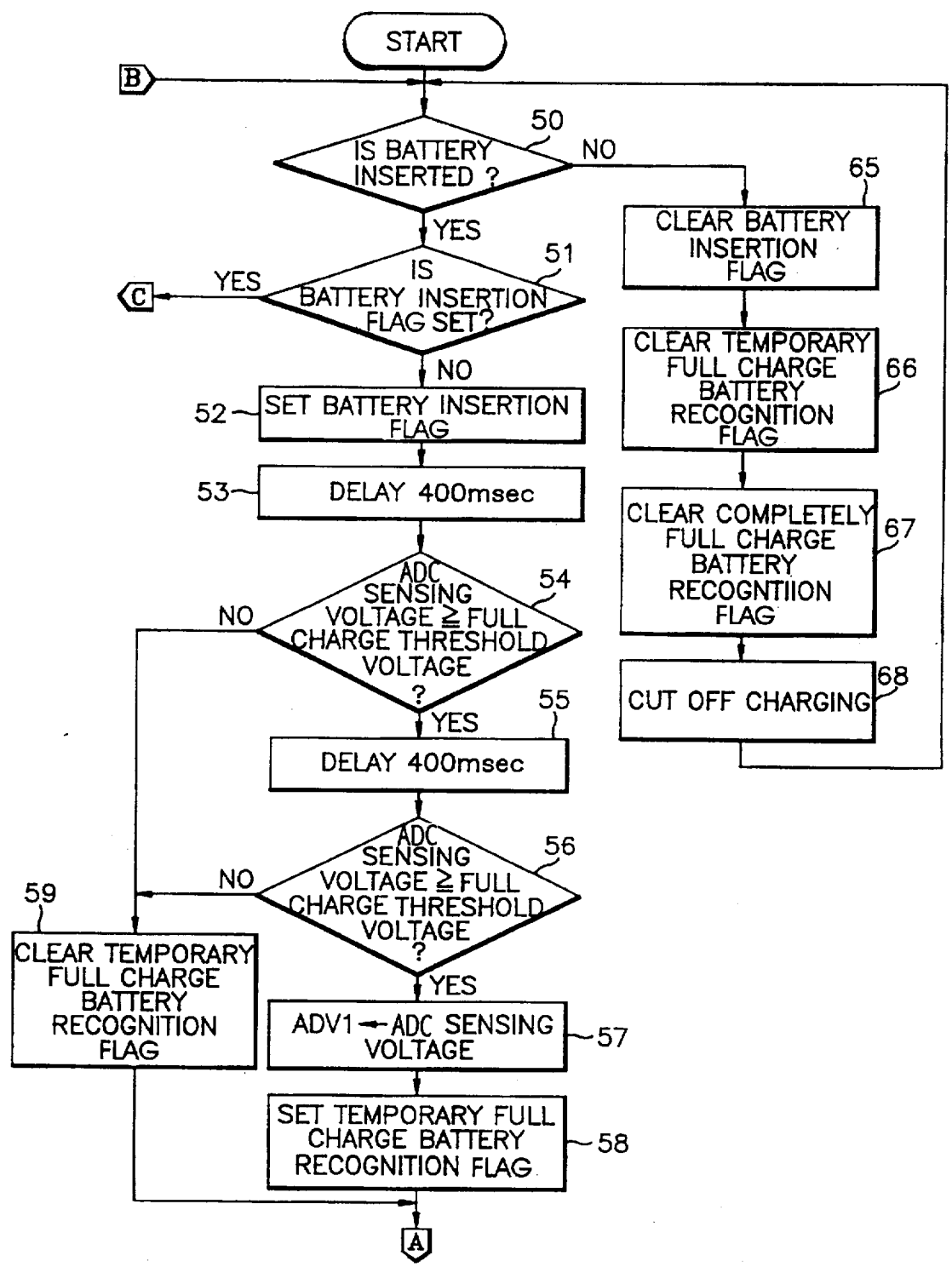
FIGS. 2A and 2B are flowchart illustrating a control process for recharging a battery according to the principles of the present invention.

Referring first to FIG. 2A in conjunction with FIG. 1, a control process is illustrated for determining when a battery pack 39 is inserted into connector 38, checking whether a fully charged battery pack was inserted prior to starting a charging operation, and interrupting, or ceasing the charging operation when a battery pack 39 is no longer the connector 38.

In step 50, CPU 31 recognizes that a battery pack 39 has not been inserted when a sensed voltage value output by ADC 34 is zero, and in steps 65, 66 and 67 clears a battery insertion flag, a temporary full charge battery recognition flag and a completely full charge battery recognition flag in RAM 33. In step 68, CPU 31 outputs an "off" switching control signal via port 35 to a control terminal of the switch 37 to cut off any power being supplied to connector 38. Switch 37 may be turned "on" to complete the connection between connector 38 and constant power unit 40 when a logic "high" level signal is input to the control terminal, while it may be turned "off" to break the connection when a logic "low" level signal is input to the control terminal.

If a battery pack 39 was determined to be inserted into connector 38 in step 50, CPU 31 checks in step 51 whether the battery insertion flag has been set in RAM 33. If the battery insertion flag has not been set, in step 52 CPU 31 sets the battery insertion flag and provides a visual indication that a battery has been inserted.

Figure 3:
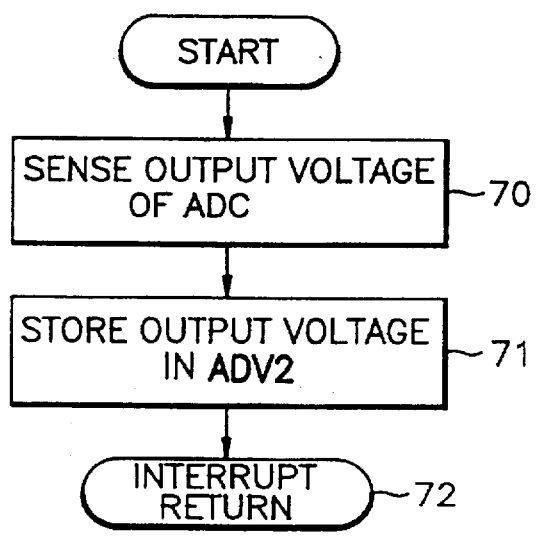
FIG. 3 is a flowchart illustrating control processes of a first interrupt routine performed according to the principles of the present invention.

CPU 31 automatically jumps to a first interrupt control routine illustrated in FIG. 3 whenever an internal timer counts one hundred milliseconds. In step 70 of the first interrupt control routine, CPU 31 reads the output of ADC 34 to sense the battery pack voltage as a digital value, and in step 71 stores the sensed voltage in an internal memory area ADV2 of RAM 33 before ending the interrupt routine in step 72. That is to say, the CPU 31 performs the interrupt control routine of FIG. 3 every one hundred milliseconds and can therefore sense the battery voltage at a very high speed.

Returning to FIG. 2A, after setting the battery insertion flag in step 52, CPU 31 delays approximately four hundred milliseconds in step 53, before comparing in step 54 the most recent ADC sensing voltage stored in memory area ADV2 by the first interrupt control routine with a preset full charge threshold voltage in order to detect the current charge state of the battery pack 39. If in step 54 the checked battery voltage in the battery pack 39 was at least equal to the preset full charge threshold voltage, CPU 31 in step 55 delays about 400 milliseconds, and in step 56 again compares the current voltage stored in the memory area ADV2 with the full charge threshold voltage. When the current value of the battery voltage stored in the memory area ADV2 is twice determined to be greater than or equal to the full charge threshold voltage at 400 millisecond intervals, CPU 31 in step 57 stores the most recent ADC sensing voltage in a memory area ADV1 of the RAM 33, and in step 58 sets the temporary full charge battery recognition flag in RAM 33 before proceeding to step 60 of FIG. 2B.

Figure 2B:
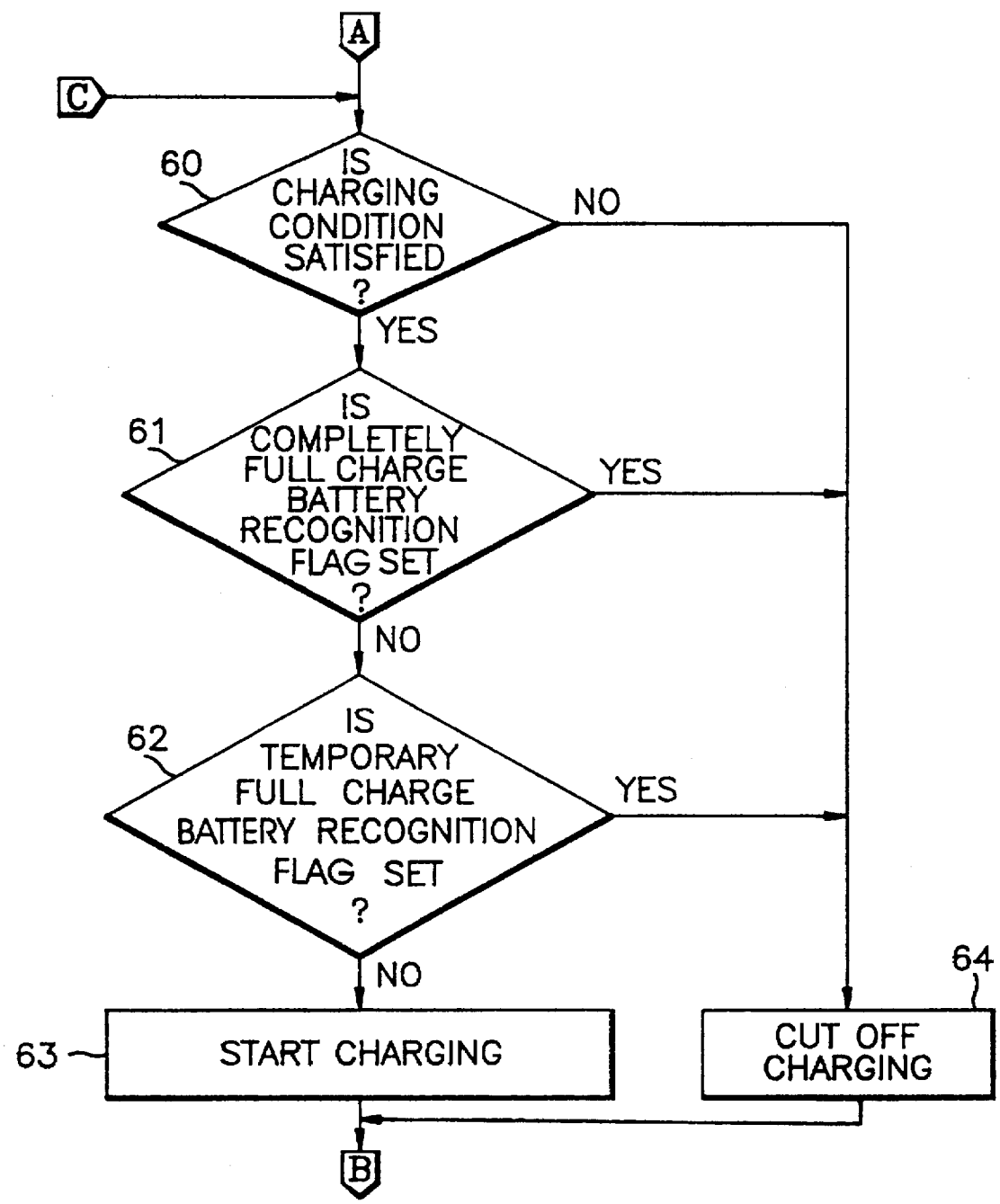

If the ADC sensing voltage of the battery pack 39 stored in the memory area ADV2 is determined to be less than the preset full charge threshold voltage in either step 54 or 56, CPU 31 in step 59 immediately clears the temporary full charge battery recognition flag in RAM 33 before proceeding to step 60 of FIG. 2B. Accordingly, the temporary full charge battery recognition flag is set, or cleared, depending on whether a battery pack 39 is inserted while having an initial charged voltage that is greater than the preset full charge threshold voltage, and indicates whether a fully charged battery has been inserted.

Turning now to FIG. 2B, CPU 31 in step 60 checks whether or not a charging condition is satisfied. Herein, a charging condition is satisfied if a minus delta voltage $-\Delta V$ is not generated and a preset charging time has not expired. If the charging condition is satisfied, CPU 31 in steps 61 and 62 detects the states of the completely full charge battery recognition flag and the temporary full charge battery recognition flag set in the RAM 33. If either the charging condition is not satisfied or one of the full charge battery recognition flags has been set, in step 64 CPU 31 provides an "off" control signal via port 35 to switch 37 to interrupt, and cut off the supply of constant voltage to the battery pack 39. A fully charged battery pack will be recognized by the steps 52–58 of FIG. 2A almost immediately after being inserted, and consequently recharging will be temporarily prevented by steps 62 and 64 of FIG. 2B. On the other hand, if the charging condition is satisfied and neither of the full charge battery recognition flags has been set, CPU 31 in step 63 provides an "on" control signal via port 35 to switch 37 to supply a constant voltage to the connector 38, thereby controlling the process of charging of the battery pack 39.

For example, if it is determined in step 61 that the completely full charge battery recognition flag was set, CPU 31 in step 64 outputs a logic "low" level signal to the input/output port 35, turning off switch 37 and interrupting, and cutting off the flow of electrical current and thus, terminating the charging of the battery pack 39, so that the battery can be prevented from being overcharged. If it is determined in step 61 that the completely and fully charged battery recognition flag was not set, CPU 31 controls switch 37 and turns the charging of the battery on or off in accordance with the state of the temporary full charge battery recognition flag determined in steps 58 or 59.

Figure 4A:
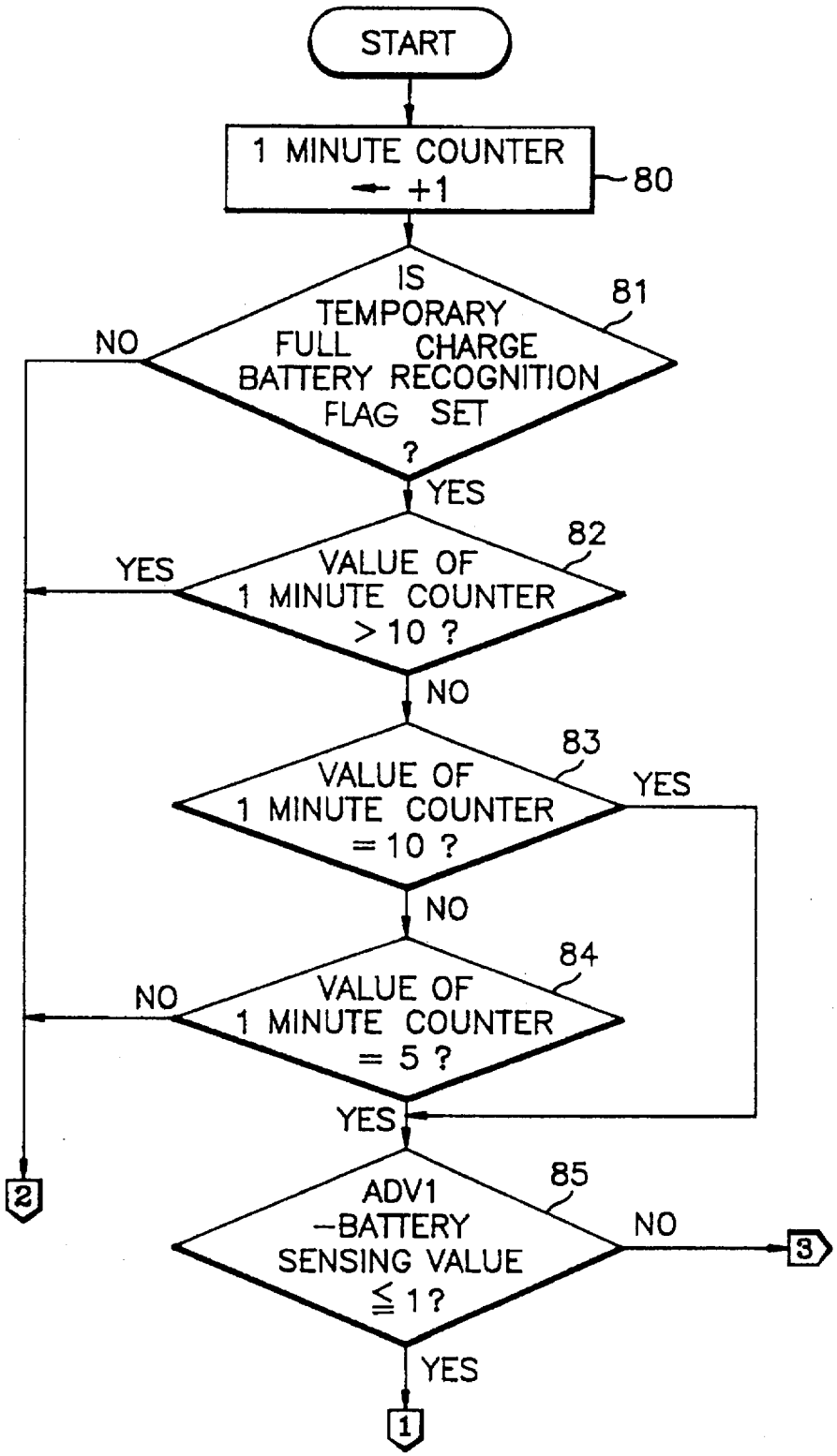
FIGS. 4A and 4B are flowchart illustrating control processes of a second interrupt control routine performed according to the principles of the present invention.
Figure 4B:
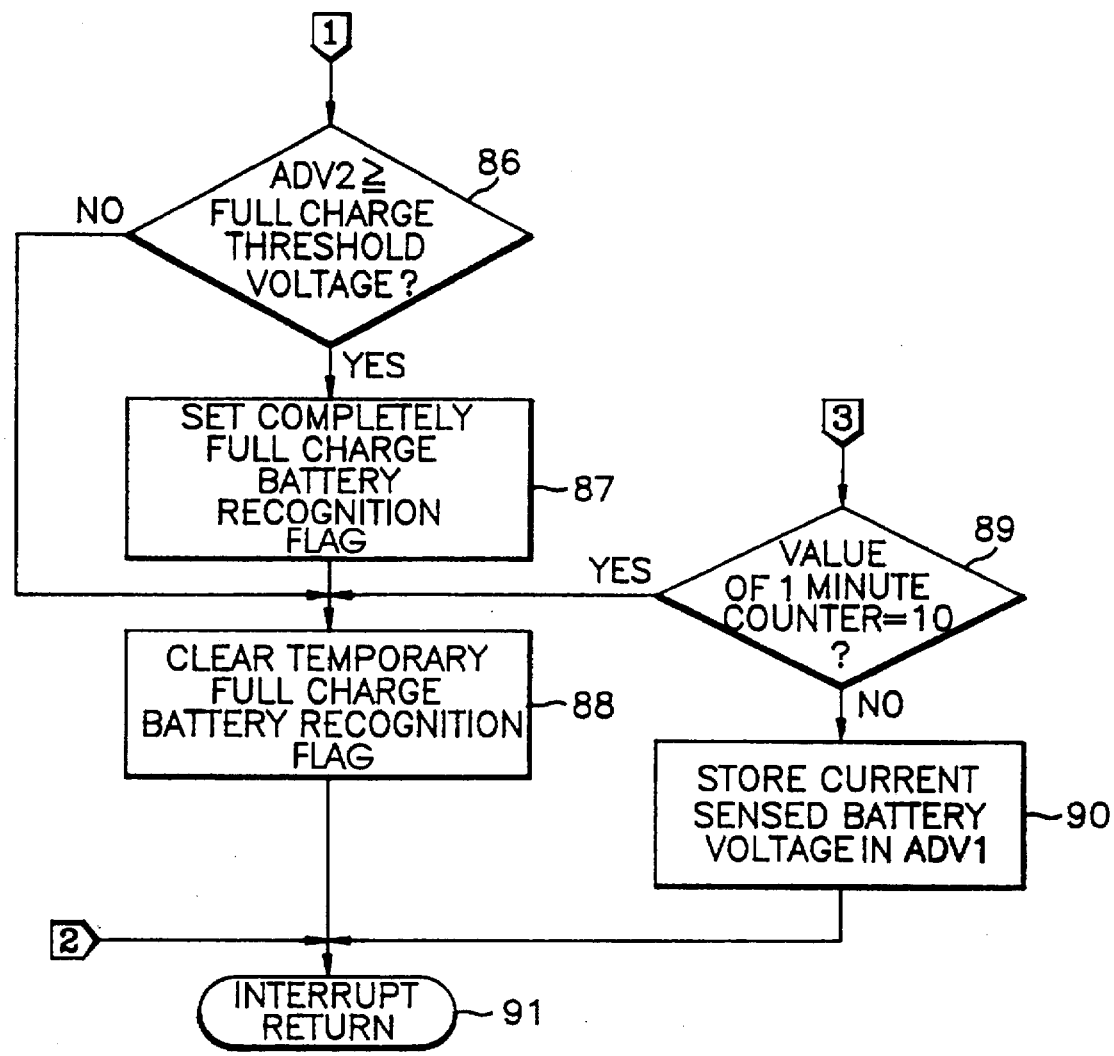

The states of completely and fully charged battery recognition flag and the temporary full charge battery recognition flag are controlled by a second interrupt control routine shown in FIGS. 4A and 4B. The second interrupt control routine is performed whenever the battery insertion flag is set and the internal timer of the CPU 31 counts, period, such as one minute.

Referring now first to FIG. 4A, the CPU 31 in a step 80 increases the minute counter by an increment of one, and in step 81 checks whether or not the temporary full charge battery recognition flag is set in the RAM 33. If the temporary full charge battery recognition flag is not set in the RAM 33, the CPU 31 recognizes that a fully charged battery is not inserted and returns from the second interrupt control routine in step 91.

On the other hand, if in the step 81, the temporary fully charged battery recognition flag in RAM 33 was determined to be set, CPU 31 checks in step 82 whether the value of the minute counter is greater than ten minutes. When the checked value of the minute counter is over ten, that is, the battery pack 39 has been inserted into the connector 38 for over ten minutes, CPU 31 jumps to step 91 to finish the second interrupt control routine. If the checked value of the minute counter is not over ten minutes, CPU 31 in step 83 checks whether the value of the minute counter is equal to ten, and if not, checks in step 84 whether the value of the minute counter is equal to five. Consequently, five minutes and ten minutes after a fully charged battery pack is initially inserted, the CPU 31 may proceed to step 85 to detect whether the current sensed battery voltage output by the ADC 34 subtracted from the voltage stored in the memory area ADV1 of the RAM 33 is less than or equal to one. Step 85 determines whether the battery pack voltage decreased twice by more than a fixed value (i.e. one volt) over the first ten minutes immediately following insertion into the charger but while not receiving a charge, indicating that the battery pack 39 was incorrectly determined to be fully charged in steps 54–58.

When the subtracted value determined in step 85 is less than or equal to one, the CPU 31 advances to step 86 to check whether the value of the sensed battery voltage stored in the memory area ADV2, namely the value updated every one hundred milliseconds, remains greater than or equal to the full charge threshold voltage. When the current sensed battery voltage is greater than or equal to the full charge threshold voltage, the CPU 31 sets the completely full charge battery recognition flag in the RAM 33 and clears the temporary full charge battery recognition flag in steps 87 and 88 respectively.

The completely full charge battery recognition flag is cleared only when the battery pack is removed from the charging unit, therefore the cut-off charging step 64 of FIG. 2B will be continuously performed, even after the temporary full charge battery recognition flag is cleared. Accordingly, a fully charged battery again inserted into the charging unit can not be accidentally overcharged, because steps 61 and 62 prevent the step 63 from starting the charging process, thereby eliminating overheating and memory effects due to overcharging in order to prolong the lifetime of the battery.

On the other hand, when in step 86 of FIG. 4B the stored current sensed battery voltage ADV2 is below that of the full charge threshold voltage, the CPU 31 immediately proceeds to step 88 to clear the temporary full charge battery recognition flag, and permit the battery back 39 to be recharged after the second interrupt routine ends in step 91. Steps 81 and 82 effectively bypass most of the second interrupt routine after the battery pack 39 has been inserted for more than ten minutes or the temporary full charge battery recognition flag is cleared. Accordingly, neither the completely or temporary full charge battery recognition flags checked in FIG. 2B are set, and voltage is supplied from the constant power unit 40 to the battery pack 39 through the switch 37 and the connector 38 until the conventional charging conditions checked in step 60 are no longer satisfied.

If the subtracted value determined in step 85 of FIG. 4A is not less than or equal to one, the CPU 31 in step 89 determines whether the value of the minute counter is equal to ten minutes. If not, the CPU 31 immediately proceeds to step 90 and stores the current sensed battery voltage read through the ADC 34 in the memory area ADV1 of the RAM 33, for comparison with the current battery sensing value the next time step 85 occurs.

If the checked value of the minute counter is equal to ten minutes, the CPU 31 proceeds to the aforementioned step 88 and clears the temporary full charge battery recognition flag without ever setting the completely full charge recognition flag, permitting charging to begin.

As described above, when a battery pack 39 initially having a sensed voltage greater than a full charge threshold voltage is inserted into the connector 38, the CPU 31 checks whether or not the voltage of the battery pack 39 varies at a point in time five minutes and ten minutes after insertion by performing the second interrupt control routine shown in FIGS. 4A and 4B, thereby determining whether a fully charged battery pack 39 was initially inserted before charging of the battery. In other words, when first the temporary full charge battery recognition flag is set, and later the completely full charge battery recognition flag is set by the second interrupt control routine in accordance with the voltage of the battery pack 39, a voltage is not supplied to the battery pack 39 according to the control process of the present invention.

In the event that a rechargeable battery pack 39 is inserted into the connector 38, the CPU 31 delays about four hundred milliseconds for stabilizing the operation of the hardware and senses the current value of the battery voltage. As previously mentioned, the CPU 31 first compares the current sensed value of the battery voltage with the full charge threshold voltage, delays for four hundred milliseconds, then again compares the current sensed value of the battery voltage with the full charge threshold voltage, and sets or clears the temporary full charge battery recognition flag according to the result of the comparison. Moreover, when the temporary full charge battery flag was set, the CPU 31 tentatively determines that a fully charged battery was inserted, checks the voltage of the battery pack 39 again after five and ten minutes have elapsed, and sets the completely full charge battery recognition flag if the currently sensed voltage has decreased by a predetermined amount but is still greater than the full charge threshold voltage.

By the way of example, after twice comparing the initial sensed battery voltage with a preset full charge threshold voltage, if the sensed value of the battery voltage does not exceed the preset full charge threshold voltage, the CPU 31 charges the battery pack 39 with the output voltage of the power unit 40. On the other hand, when the value of the sensed voltage of a just inserted battery pack 39 is greater than or equal to the preset full charge threshold voltage, the CPU 31 sets the temporary full charge battery recognition flag and cuts off charging of the battery pack 39. In addition, when the temporary full charge battery recognition flag is set, the CPU 31 compares the value of the sensed voltage of the battery pack 39 with the full charge threshold voltage at five minute intervals during a second interrupt control routine. In the case that the battery voltage almost reaches the full charge threshold voltage (i.e., in this time the error is one volt), CPU 31 cuts off the charging of the battery, thereby preventing in advance the overheating and the overcharging thereof.

As apparent from the foregoing, a circuit and a process are provided by which the battery voltage is checked at a very high speed to determine if a fully charged battery was inserted, and in the event the sensed battery voltage maintains a preset full charge threshold voltage for a predetermined time, ensures that the charging voltage remains cut-off to prevent overcharging and thereby prolong the lifetime of the battery.

What is claimed is:

1. A charging device of a rechargeable battery, comprising: constant a power source for outputting a constant voltage of a given level irrespective of a current output therefrom;

a battery pack accommodating insertion of said battery;

a switch for turning on and turning off charging of said battery by selectively supplying said battery with said constant voltage output from said power source through said battery pack in response to a switch control signal;

a battery voltage sensing means connected to said battery pack for sensing a battery output voltage across the battery for each given period of time during said insertion of said battery into said battery pack;

a comparing means for making a comparison of a preset full charge threshold voltage with said battery output voltage sensed by said battery voltage sensing means, and for outputting a signal in accordance with said comparison; and a control means for generating said switch control signal in accordance with said signal output by said comparing means, said switch control signal driving said switch and turning on said charging of said battery in the event that said sensed battery output voltage is less than said full charge threshold voltage, and driving said switch and turning off said charging of said battery in the event that said sensed battery output voltage is more than said full charge threshold voltage.

2. The charging device as defined in claim 1, wherein said battery voltage sensing means is comprised of digital processing means connected to said battery pack, which delays an output voltage of said battery pack during a given time, and senses and outputs said output voltage of said battery pack as digital data by the given period of time.

3. The charging device as recited in claim 1, further comprising:

a connector removably connecting the battery via said battery pack to said switch and to said battery voltage sensing means, said comparing means generating an output signal causing said control means to generate a switch control signal interrupting electrical conduction by said switch and preventing said constant voltage output from said constant power means from being supplied to said connector when the battery is first connected to said connector via said battery pack and when the battery is disconnected from said connector, said switch remaining in an electrically open state in the event that a battery output voltage sensed by said battery voltage sensing means after initially being connected to said battery pack while said battery pack contains a battery bearing more than said full charge threshold voltage.

4. A control unit for a battery charging device having a power supply for outputting a constant voltage at a given level, a battery pack into which a rechargeable battery is inserted, and a switch for supplying said battery with said constant voltage output from said power supply through said battery pack in response to a switch control signal, said control unit comprising:

battery voltage sensing means for sensing a battery voltage every given period of time;

first comparing means for comparing a preset full charge threshold voltage with said sensed battery voltage and setting a temporary full charge state when said sensed battery voltage is greater than said preset full charge threshold voltage;

second comparing means, responsive to said setting of said temporary full charge state by said first comparing means, for comparing said preset full charge threshold voltage with an output of said battery voltage sensing means at a constant unit time interval and setting a completely full charge battery recognition flag when said sensed battery voltage is greater than that of said preset full charge threshold voltage throughout a number of said constant unit time intervals; and control means for generating said switch control signal for cutting off the charging of said battery in response to the setting of said completely full charge battery recognition flag by said second comparing means.

5. The charging device as recited in claim 4, wherein said battery voltage sensing means is comprised of an analog/digital converter connected to said battery pack, which delays for a given period of time, senses an analog output voltage value of said battery pack as sensed digital data at the end of said given period of time, then outputs said sensed data to said comparing means.

6. The charging device as defined in claims 4, wherein said battery voltage sensing means, said first comparing means, said second comparing means and said control means are constituted by a single chip microprocessor.

7. A charging control method of a charging device including a power source for outputting a constant voltage of a given level irrespective of a current output therefrom, a rechargeable battery, a switch for supplying said battery with said constant voltage output from said power source in response to a switch control signal, analog/digital converting means connected to said battery, and a port for generating said switch control signal controlling said switch, said method comprising the steps of:

sensing an output voltage of said battery by a period of first unit time and storing said sensed output voltage in a first memory area;

in response to the sensing of said output voltage of said battery, determining that a charging voltage of said battery reaches a full charge state when said sensed battery voltage is more than a preset full charge threshold voltage, and that said charging voltage of said battery does not reach said full charge state when said sensed battery voltage is less than said preset full charge threshold voltage; and generating said switch control signal to cut off charging of said battery when said charging voltage of said battery is determined to reach a full charge state, and generating said switch control signal to supply said battery with said charging voltage when said charging voltage of said battery is determined not to reach a full charge state.

8. A method for controlling a battery charging unit, said method comprising the steps of:

determining whether a battery has been inserted into the charging unit according to a voltage sensed by the charging unit;

after determining that a battery has been inserted into the charging unit, sensing an initial output voltage across the battery;

setting a temporary full charge battery recognition flag in the event that said initial sensed battery output voltage is more than a preset full charge threshold voltage, and clearing said temporary full charge battery recognition flag in the event that said initial sensed battery output voltage is not more than said preset full charge threshold voltage;

in response to the setting of said temporary full charge battery recognition flag, waiting until expiration of a predetermined time period and comparing a current output voltage across the battery with said preset full charge threshold voltage;

setting a completely full charge battery recognition flag in accordance with whether said current battery output voltage is more than said preset full charge threshold voltage; and supplying the battery with a charging voltage when said completely full charge battery recognition flag and said temporary full charge battery recognition flag are not set and interrupting application of said charging voltage supplied to said battery when at least one of said completely full charge battery recognition and said temporary full charge battery recognition flags are set.

9. The control method as recited in claim 8, further comprising:

storing said initial battery output voltage in response to the setting of said temporary full charge battery recognition flag;

clearing said temporary full charge battery recognition flag when a given value is exceeded both by a difference between said stored initial battery output voltage and said current battery output voltage, and by a difference between said current battery output voltage and an output voltage sensed after waiting for expiration of a second predetermined time period.

10. A charging device for a rechargeable battery, comprising:

a power source for generating a constant voltage at a given level irrespective of a current output therefrom;

a connector for receiving and making electrical contact with a battery;

a switch for selectively connecting said power source to said connector to charge the battery in response to a switch control signal;

a battery voltage sensing means for providing battery voltage values sensed across the battery received by said connector; and a control means for comparing a preset full charge threshold voltage value with said battery voltage values provided by said battery voltage sensing means, and for generating said switch control signal for charging the received battery within a first time period after the battery is received by said connector means only when said battery voltage value sensed within said first time period is not greater than said full charge threshold voltage value.

11. A charging device as recited in claim 10, further comprising said control means determining during a start of said first time period when a battery is received by said connector means in accordance with sensing of a non-zero voltage across said battery voltage, and setting a temporary full charge battery recognition flag when said non-zero voltage at said start of said first time period are not less than said preset full charge threshold voltage value, said set temporary full charge battery recognition flag inhibiting generation of said switch control signal by said control means during said first time period.

12. A charging device as recited in claim 4, said control means and said battery voltage sensing means together comprising a single chip microprocessor.

13. A charging device as recited in claim 10, further comprising:

said battery voltage sensing means comprising an analog to digital voltage converter periodically supplying to said control means values of voltages sensed across a battery; and said control means further comprising a memory storing values of voltages received from said analog to digital voltage converter, said control means storing in said memory an initial sensed battery voltage value greater than said preset full charge threshold voltage value, comparing said stored initial sensed battery voltage value to a second sensed battery voltage value output by said battery voltage sensing means at an end of said time period, and setting completely full charge battery recognition flag continuously inhibiting generation by said control means of said switch control signal for charging the received battery when said second value is neither below said initial stored value by more than a predetermined margin nor less than said full charge threshold voltage value.

14. The charging device as recited in claim 13, further comprising said control means storing said second value in said memory when said second value is below said initial stored value by more than said predetermined margin, comparing said stored second value to a third sensed battery voltage value output by said battery voltage sensing means at an end of a second time period greater than said time period, generating said switch control signal when said third value is less than said second stored value by more than said predetermined margin, and alternatively generating said switch control signal when said third value is less than said full charge threshold voltage.

* * * * *